Nov. 15, 1932.  H. A. GEHRES ET AL  1,887,635
FRICTION CLUTCH
Filed Dec. 4, 1929  3 Sheets-Sheet 3
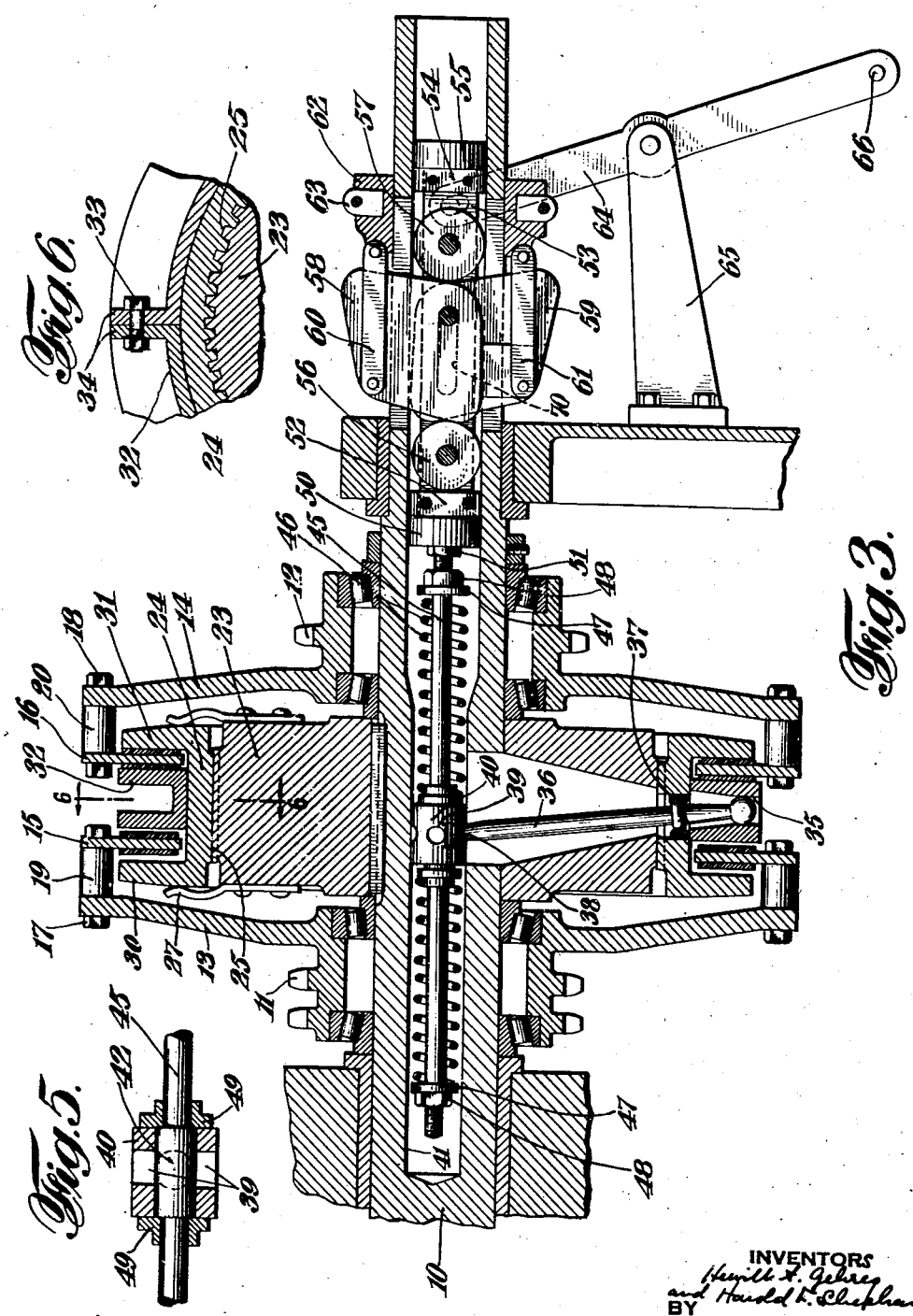
INVENTORS
ATTORNEYS Patented Nov. 15, 1932

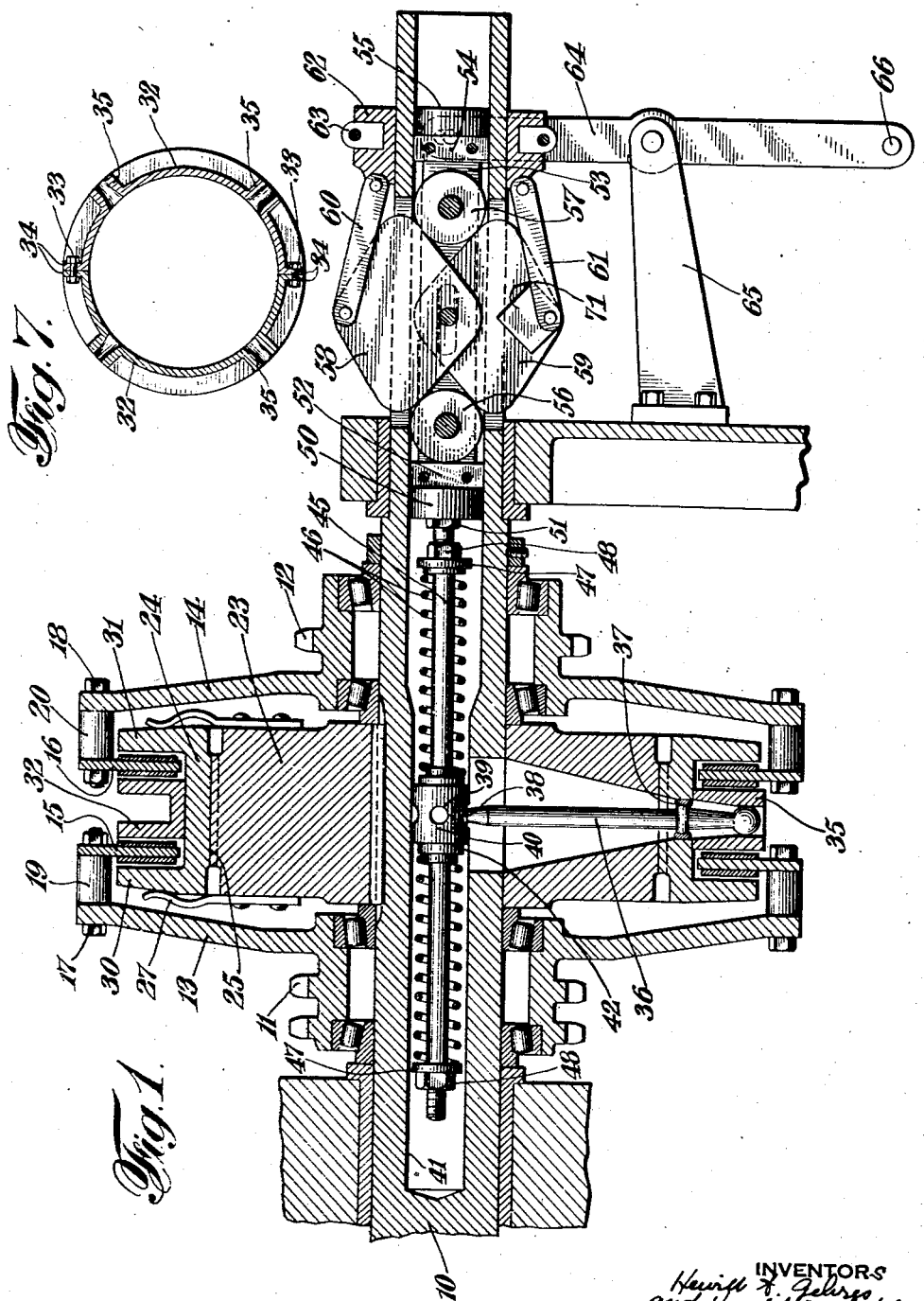

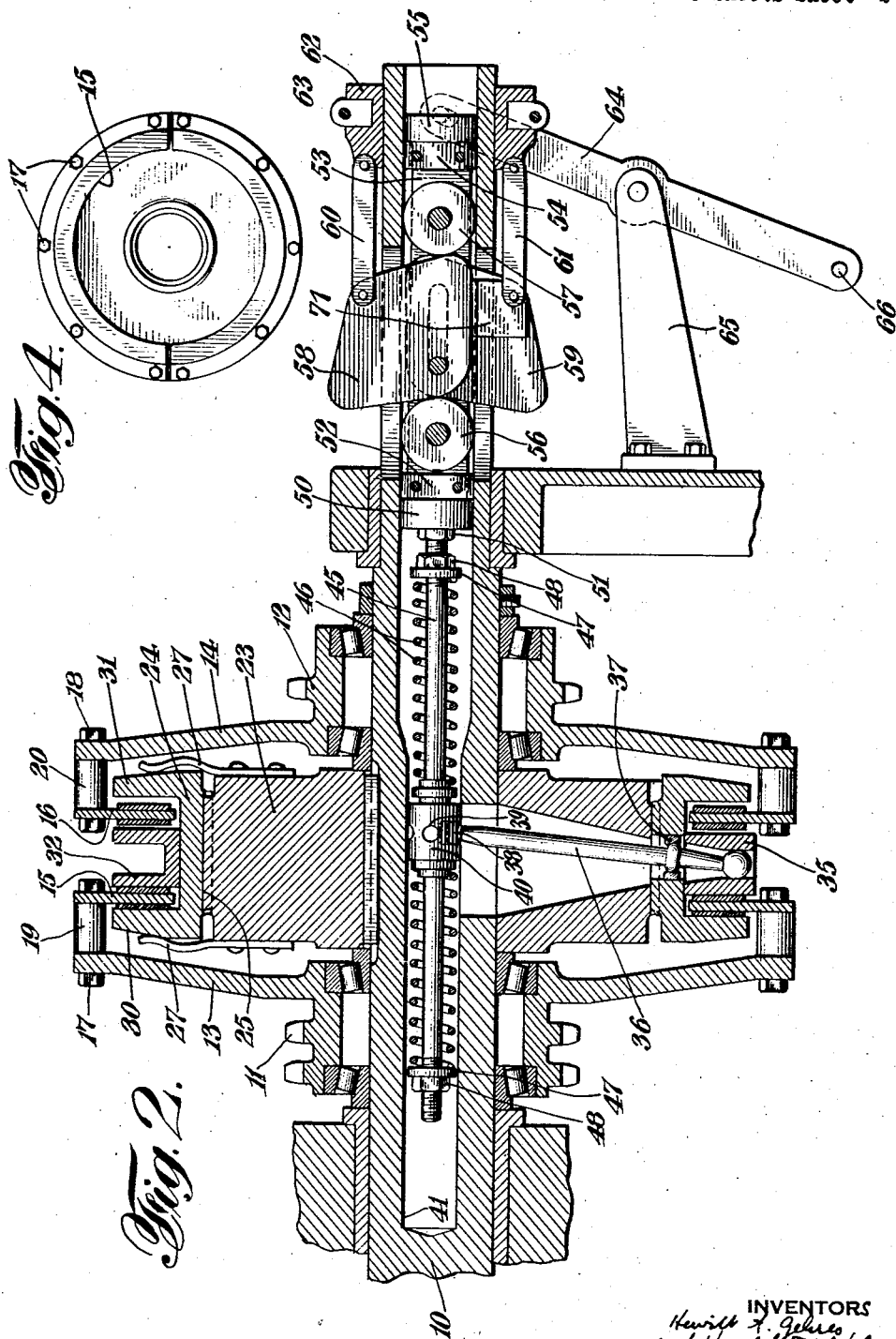

1,887,635

UNITED STATES PATENT OFFICE

HEWITT A. GEHRES AND HAROLD F. SHEPHERD, OF MOUNT VERNON, OHIO, ASSIGNORS TO COOPER-BESSEMER CORPORATION, OF MOUNT VERNON, OHIO, A CORPORATION OF OHIO

FRICTION CLUTCH

Application filed December 4, 1929. Serial No. 411,453.

This invention relates to an improved clutch device according to certain features of which a single mechanism may be employed for operating two clutches selectively, the mechanism being adapted to be located on either a driving or driven shaft.

One of the objects of this invention is the construction of an improved clutch mechanism which is simple in design, sure of operation, and which is automatically held in either of the operative positions into which it may be thrown, and automatically centralized into neutral position when it is moved from either of its operative positions.

Another object is the provision of a clutch mechanism in which the clutch members may be moved into and automatically held under spring pressure in their properly engaged positions, and automatically retained in neutral position when desired.

Other objects consist in combinations and improvements of specific features of clutch mechanisms as will appear from the following description taken in connection with the drawings in which—

Fig. 1 is a longitudinal section of the driving shaft and clutch mechanism showing the clutch mechanism in neutral position;

Fig. 2 is a similar section showing the clutch in operated position for forward operations;

Fig. 3 is a similar section showing the clutch in operated position for reverse operations;

Fig. 4 shows a driven clutch ring;

Fig. 5 shows the clutch operating rod and the bearing for the inner ends of the clutch levers;

Fig. 6 is a section on the line 6—6 of Fig. 3 and

Fig. 7 is a longitudinal section of the outer clutch ring.

The various figures show a shaft 10 which for the purposes of this description will be referred to as a driving shaft, though it will be obvious that the clutch mechanism may be mounted on a driven shaft, its parts hereinafter described as driving elements then becoming driven elements, and vice versa. The shaft 10 may be an engine crank shaft or any other shaft from which power is to be communicated, and may be supported in any suitably placed bearings as indicated.

Movement from the shaft 10 is transmitted selectively to forward and reverse sprocket wheels 11 and 12 rotatable on roller bearings supported on the shaft by any suitable well known means. For the purposes of this invention, pulleys, gears, or other suitable driving contrivances may be used instead of the sprocket wheels. The sprocket wheel 11 may be termed a forward sprocket wheel as this wheel is clutched to the shaft when mechanism, for example a drilling mechanism not shown, is to be driven forwardly. The sprocket wheel 12 may be termed a reverse sprocket wheel as this wheel is clutched to the shaft to drive such mechanism reversely. It is obvious that the sprocket wheels could be made of different size to drive a mechanism at different speeds or that the sprocket wheels could drive different mechanisms alternately at the same or different speeds. The terms forward and reverse are used in the specifications as the sprocket wheels in actual practice have been put to this use.

The wheels 11 and 12 are connected to disks 13 and 14 extending radially beyond the wheels to which annular friction faced driven clutch members shown in the form of rings 15 and 16 are secured in spaced relation by circular series of bolts 17 and 18 and spacers 19 and 20. The rings 15 and 16 are preferably made in sections as shown in Fig. 4.

Keyed to the shaft 10 and surrounded by the friction faced rings 15 and 16 is a hub 23 on which is supported a laterally shiftable driving clutch member or ring 24 which may be provided with teeth 25 engaging teeth 26 on the hub 23, as indicated in Figs. 1, 2, 3 and 6, to provide a strong driving connection between the clutch ring 24 and hub 23. The clutch ring 24 is held on the hub 23 by spring clips 27 as shown, which return the ring 24 to neutral position when the clutch throwing lever later referred to, is thrown into neutral position.

The driving clutch member 24 is provided with opposed engaging members 30 and 31 for cooperation respectively with the outer faces of the driven friction faced rings 15 and 16.

Slidable laterally on the flanged clutch ring 24 is a further shiftable driving clutch member shown in the form of a ring 32, which as shown in Fig. 7, may be made in sections suitably secured together by bolts 33 and upstanding lugs 34 on the sections, for purposes of assembly.

Formed on the ring 32 are sockets 35 for the ball-shaped outer ends of levers 36 each of which is fulcrumed as shown at 37 in the ring 24 and provided with a ball-shaped inner end 38 bearing in a socket 39 in a short cylindrical member 40 slidable in a bore 41 in the shaft 10.

The member 40 is supported on an enlarged portion 42 of a rod 45 by springs 46 bearing at one end against washers 47 held in position by nuts 48 threadedly engaging the rod 45, and bearing at their other ends against washers 49 engaging the ends of the enlarged portion 42 and the member 40.

The rod 45 is extended to the right and threadedly engages a cylindrical member 50 and is locked therein by a lock nut 51. The member 50 is provided with a diametrical end flange 52 to each side of which is secured a plate 53 extending to the right. These plates are secured to the flange 54 of a second cylindrical member 55 similar but opposed to the member 50.

Supported on and located between the plates 53 are rollers 56 and 57 with which cooperate cams 58 and 59 supported between said plates on a pin secured in the walls of the shaft 10 and extending through slots 70 in said plates.

These cams are operated by links 60 and 61 from a ring member 62 slidable but non-rotatable on the shaft 10. The ring member is grooved to rotatably receive a cooperating ring member 63 to which is connected an operating lever 64 suitably supported on a bracket 65 on a fixed part on the frame of the machine. The lever 64 may be manipulated directly or by a hand lever pivoted to a pin 66 as is well understood.

The operating lever 64, the cams 58, 59, rollers 56 and 57, rod 45, member 40, and rings 24 and 32 are in their neutral position in Fig. 1, the equal pressure of the springs 46 automatically centralizing the member 40 whenever the rod 45 is moved into its central position by the cams 58 and 59 cooperating with the rollers 56 and 57 as shown in Fig. 1. The clutch ring 24 in this figure is held centralized by the spring clips 27. As understood, when the clutch ring 24 and the member 40 are centralized, the outer clutch ring 32 is held centralized by the levers 36.

When the forward sprocket wheel 11 is to be driven by the shaft 10, the operating lever 64 is rocked clockwise as shown in Fig. 2. This rocks the cams 58 and 59 clockwise and counter-clockwise respectively into the position shown in Fig. 2. As they are moved they bear against the roller 57 and draw the rod 45 to the right. This movement of the rod by means of the spring 46 on the left end of the rod moves the member 40 to the right which through the levers 36 moves the ring 32 to the left against the friction faced ring 15 carried by the forward sprocket wheel 11, which engagement causes the fulcrums of the levers to move the clutch ring 24 to the right against the ring 15. The movement of the rod 45 is greater than the movement of the member 40, with the result that the left-hand spring 46 presses the rings 24 and 32 into engagement with the ring 15 and consequently functions to hold the clutch members engaged even after considerable wear.

As shown in Fig. 2, the cams 58 and 59 are shaped so that there is a slight return movement of the rod 45 after it has been shifted. The left hand spring 46 on the rod 45, therefore, also tends to hold the cams and rod and other parts in shifted position. This is also the case when the cams are shifted as in Fig. 3, to clutch the reverse sprocket wheel 12 to the shaft 10. In this case the right hand spring 46 presses the rings 24 and 32 into engagement with the ring 16 carried by the reverse sprocket wheel 12.

As shown in Fig. 1, the shape of the cams 58 and 59 is such that centrifugal force acts to hold the cams in neutral position. The member 40 is centralized by the springs 46 which together with the spring clips 27 centralize the rings 24 and 32.

As shown in Figs. 1, 2 and 3, a cam block 71 secured to the cam 59 limits the movement of the cams 58 and 59 to arrest their movement just after the high points of the cams have passed beyond the rollers 56 and 57. The springs 46, as stated before, operating through the rollers 56 and 57, retain the cams 58 and 59 in their adjusted positions as shown in Figs. 2 and 3. This in turn holds the rod 45 in shifted position which by means of one of the springs 46, holds the rings 24 and 32 against one of the rings 15 or 16.

While certain specific embodiments of the invention have been described it will be obvious that many changes may be made therein without departing from its principles as defined in the appended claims.

I claim:

1. The combination of a bored rotatable shaft, an inner clutch member rotatable therewith and longitudinally slidable with respect thereto, and provided with a radial aperture, an outer clutch member loosely surrounding said inner clutch member and provided with an aperture in alinement with said radial aperture of said inner clutch member, a lever pivoted in the aperture of said inner clutch member and having an end bearing in the aperture of said outer clutch member and having its other end projecting into the bore of said shaft, and motion communicating means for said lever, located within said bore.

2. The combination of a bored shaft, a clutch mechanism supported on said shaft, a longitudinally extending rod in said bore for actuating said clutch mechanism, a pair of spaced rollers supported to transmit to and fro movement to said rod, and a pair of cam members located between said rollers and pivoted on said shaft for pivotal movement in opposite directions to cooperate with either of said rollers to move the rod in either of two directions.

3. The combination of a bored driving shaft, clutch throwing mechanism comprising a movable rod mounted longitudinally of said bore, a pair of double operating cams mounted in a longitudinally extending slot extending through the axis of said shaft and communicating with said bore, a pivot for said cams lying on a diameter of said shaft, means for transmitting movement from said cams to said shaft, links connected to said cams, a ring adjustable longitudinally of said shaft and connected to said links, and means for moving said ring to a neutral position and working positions on opposite sides of said neutral position, the construction being such that the links assume a parallel relation to the shaft in either working position and slightly overthrow the cams.

4. The combination of a rotatable driving shaft, laterally shiftable clutch rings rotatable with said shaft, a driven element adapted to be engaged by said rings, a lever pivoted to one of said rings and engaging in the other ring to shift said rings towards each other into engagement with said driven element, an operating means for said lever comprising spring means, said lever operating first to move one of said rings into engagement with the driven element and then the other ring into engagement with said driven element, and spring means for resisting movement of said other ring into engagement with said driven element and cooperating with the lever as it moves into neutral position to move said rings into neutral position.

5. The combination of a rotatable bored shaft, laterally shiftable clutch rings on said shaft, a lever pivoted to one of said rings and engaging the other and extending into the bore of said shaft, a shiftable rod in said bore, opposing springs operatively connected to said lever and adapted upon movement of said rod to transmit movement to said lever, and spring means cooperating with one of said rings and adapted to be compressed as said levers are rocked, said springs and spring means operating to restore said rings and lever to neutral position as the rod is moved into neutral position.

6. The combination of a rotatable bored shaft, an inner outwardly opening channeled clutch member rotatable therewith and slidable axially with respect thereto, and provided with a radial aperture, an outer outwardly opening channeled clutch member loosely surrounding said inner clutch member and provided with an aperture in alignment with said radial aperture of said inner clutch member, a lever having one end and a portion adjacent to said end bearing in said apertures and having its other end projecting into the bore of said shaft, and motion communicating means for said lever located in the bore of said shaft.

7. The combination of a rotatable shaft, an inner outwardly opening channeled clutch member mounted for rotation with the shaft and for sliding movement axially thereof, an outer outwardly opening channeled clutch member mounted within the channel of the inner clutch member and slidable transversely thereof, said channeled members being spaced laterally, driven clutch elements within the spaces between said channeled members, and means for moving said channeled members relatively laterally to connect either of said driven members to said shaft.

8. The combination of a rotatable shaft, an inner outwardly opening channeled clutch member rotatable with the shaft, an outer clutch member mounted within the channel of said inner clutch member and slidable laterally thereof, driven clutch elements located between said outer clutch element and the walls of said inner clutch member, and means for moving said outer clutch member laterally for connecting said shaft to either of said driven elements.

In testimony whereof they have signed their names to this specification.

HEWITT A. GEHRES.
HAROLD F. SHEPHERD.